United States Patent
Batkilin et al.

(10) Patent No.: US 9,291,726 B2
(45) Date of Patent: Mar. 22, 2016

(54) SYSTEM AND METHOD FOR CORRECTION OF GEOMETRIC DISTORTION OF MULTI-CAMERA FLAT PANEL X-RAY DETECTORS

(75) Inventors: Eduard Batkilin, Nesher (IL); Irina Karelin, Haifa (IL); Alex Feldman, Nofit (IL)

(73) Assignee: GENERIC IMAGING LTD., Nesher (IL)

( * ) Notice: Subject to any disclaimer, the term of this patent is extended or adjusted under 35 U.S.C. 154(b) by 208 days.

(21) Appl. No.: 14/113,587

(22) PCT Filed: Apr. 24, 2012

(86) PCT No.: PCT/IL2012/050145
§ 371 (c)(1),
(2), (4) Date: Oct. 24, 2013

(87) PCT Pub. No.: WO2012/147081
PCT Pub. Date: Nov. 1, 2012

(65) Prior Publication Data
US 2014/0086394 A1 Mar. 27, 2014

Related U.S. Application Data

(60) Provisional application No. 61/517,671, filed on Apr. 25, 2011.

(51) Int. Cl.
*G01T 7/00* (2006.01)
*G01T 1/20* (2006.01)

(52) U.S. Cl.
CPC .............. *G01T 7/005* (2013.01); *G01T 1/2018* (2013.01)

(58) Field of Classification Search
CPC ........ A61B 6/032; A61B 6/585; A61B 6/582; A61B 6/4233; A61B 6/03; A61B 6/58; A61B 6/584
See application file for complete search history.

(56) References Cited

U.S. PATENT DOCUMENTS

| | | | |
|---|---|---|---|
| 4,143,271 A | 3/1979 | Klein et al. | |
| 4,424,446 A | 1/1984 | Inbar et al. | |

(Continued)

FOREIGN PATENT DOCUMENTS

| | | |
|---|---|---|
| EP | 1207421 | 5/2002 |
| IL | 52873 | 10/1987 |

OTHER PUBLICATIONS

International Search Report of Application No. PCT/IL2012/050145 mailed on Aug. 30, 2012.

(Continued)

*Primary Examiner* — Hoon Song
(74) *Attorney, Agent, or Firm* — Pearl Cohen Zedek Latzer Baratz LLP

(57) ABSTRACT

System and method for correcting geometric distortion in a multi-camera flat panel X-Ray detector. A scintillator converts X-Ray radiation generated by an X-Ray source into detectable radiation. Internal markers are placed at known locations adjacent to the scintillator, inside a casing of the detector. External markers placed at known locations outside the casing, adjacent to a cover of the detector. At least one imaging sensor acquires, during the calibration phase, a partial image depicting the external markers and the internal markers. The location of the external markers and the internal markers on the partial X-Ray image is found. A parallax free transformation for correcting geometric distortion based on differences between relation between physical location of the external markers and location of the external markers on the X-Ray image and relation between physical location of the internal markers and location of internal markers on the partial X-Ray image is calculated.

14 Claims, 3 Drawing Sheets

(56) References Cited

U.S. PATENT DOCUMENTS

| | | |
|---|---|---|
| 2005/0226389 A1 | 10/2005 | Yoon et al. |
| 2005/0281385 A1 | 12/2005 | Johnson et al. |
| 2006/0159223 A1 | 7/2006 | Wu et al. |
| 2007/0086559 A1 | 4/2007 | Dobbs et al. |
| 2008/0240360 A1 | 10/2008 | Jabri |
| 2010/0046718 A1 | 2/2010 | Weiser |
| 2010/0140487 A1 | 6/2010 | Barrett |
| 2011/0198503 A1 | 8/2011 | Koren et al. |

OTHER PUBLICATIONS

Richard Szeliski. Computer Vision: Algorithms and Applications. Springer, New York, 2010.

European Supplementary Search Report for Application No. 12776462.9, mailed on Oct. 13, 2014.

Mitsunaga et al. "Radiometric Self Calibration" Computer Vision and Pattern Recognition, 1999. IEEE Computer Society Conference on Jun. 23-25, 1999.

Tsin et al. "Statistical calibration of CCD imaging process" Computer Vision, 2001. ICCV 2001. Proceedings Eighth IEEE International Conference on (vol. 1 ), Jul. 7, 2001.

SYSTEM AND METHOD FOR CORRECTION OF GEOMETRIC DISTORTION OF MULTI-CAMERA FLAT PANEL X-RAY DETECTORS

CROSS-REFERENCE TO RELATED APPLICATIONS

This application is a National Phase Application of PCT International Patent Application No. PCT/IL2012/050145, entitled "SYSTEM AND METHOD FOR CORRECTION OF GEOMETRIC DISTORTION OF MULTI-CAMERA FLAT PANEL X-RAY DETECTORS", International Filing Date Apr. 24, 2012, published on Nov. 1, 2012, as International Patent Application Publication No. WO 2012/147081, which in turn claims priority from U.S. Provisional Patent Application No. 61/517,671, filed Apr. 25, 2011, both of which are incorporated herein by reference in their entirety.

BACKGROUND OF THE INVENTION

Flat panel X-Ray detectors are in wide use in medicine. Most of these flat panel X-Ray detectors are based on a single light detector chip coupled with a scintillator. However, detectors of such a design are typically expensive. The single detector chip may be replaced by a plurality of less expensive optical sensors (e.g. CCD or CMOS) and lenses, which are arranged into a flat multi-camera array. X-Ray detectors including the multi-camera array may be less expensive in comparison with the single chip detectors since simpler sensors and lenses may be used. In multi-camera X-Ray detectors, each optical sensor acquires optical light irradiation from a segment of the scene as radiated from the scintillator. A complete image may be composed by stitching the plurality of partial images acquired by the plurality of single sensors.

The output image quality may be measured and assessed visually by visibility of the seam between the stitched partial images. Unfortunately, two neighbor images typically have intensity discrepancies in overlapping regions caused by differences in sensors and lenses. One of the sources of image distortion is geometric distortions caused by the lenses. Unfortunately, each lens causes different geometric distortions.

According to prior art, geometric distortions may be corrected by placing a set of markers, such as a mechanical Cartesian grid, on top of the detector (the top side being the side facing the imaged body and the side at which the images are captured), during a calibration phase. The mechanical Cartesian grid may include, for example, metal sheet with substantially identical holes drilled at known and typically evenly spaced locations. X-Ray radiation is applied and an image of the grid is created on the scintillator. Each sensor acquires its portion of the scintillator image, with certain geometric distortion. The locations of the holes on the grid are known. The locations of the same holes on the distorted partial images are found using digital image processing techniques. A transformation for correcting geometric distortion is calculated based on mapping between the location of the holes on the grid and the location of the same holes on the distorted images.

Correction of geometric distortion using the method described hereinabove requires that the grid be placed on top of the scintillator directly, without any significant space between them. However, real life detectors are typically enclosed in a casing. Thus, placing the grid directly over the scintillator requires opening of the casing of the detector for calibration. However, opening of the casing of the X-Ray detector is undesirable since it can, for example, lead to contamination of the system.

On the other hand, if the grid is placed on the casing of the detector, at a distance from the scintillator, the X-Ray source geometry may cause parallax. As a result, the projection of the grid holes on the scintillator will have parallax distortion. Hence, an image of the grid will suffer from parallax distortion on top of the geometric distortion. A geometric distortion correction function derived from such an image may be inaccurate. Using such a correction function may lead to undesired distortion in the final X-ray image. The parallax distortion is independent and uncorrelated with the geometric distortion.

The magnitude of parallax distortion largely depends on a ratio between the distance from the grid to the scintillator and the distance from the scintillator to the X-Ray source. As this ratio increases (for example, as the distance from the scintillator to the X-Ray source increases), the magnitude of parallax distortion increases. Errors in estimation of the geometric distortion correction function can be minimized by placing the grid very close to the scintillator or by placing the X-Ray source at a large distance from the detector. In real life settings, however, both actions frequently cause problems.

It would, therefore, be desirable to calculate a geometric distortion correction function that is minimally influenced or even not influenced by the parallax distortion, without opening the cover of the detector.

SUMMARY OF THE INVENTION

According to embodiments of the present invention there is provided a method for correcting geometric distortion in a multi-camera flat panel X-Ray detector, the method may include placing internal markers at known locations adjacent to a scintillator of the detector, inside a casing of the detector; placing external markers at known locations outside the casing of the detector adjacent to a cover of the detector; acquiring an X-Ray image depicting the external markers and the internal markers; finding the location of the external markers and the internal markers on the X-Ray image; calculating a parallax free transformation for correcting geometric distortion based on differences between relation between physical location of the external markers and location of the external markers on the X-Ray image and relation between physical location of internal markers and location of the internal markers on the X-Ray images.

Furthermore, according to embodiments of the present invention the method may include adjusting X-Ray images of the imaging sensor acquired during routine operation of the detector, using the parallax free transformation.

Furthermore, according to embodiments of the present invention calculating the parallax free transformation may include calculating an initial transformation for correcting geometric distortion based on the relation between physical location of the external markers and location of external markers on the X-Ray image; applying the transformation to location of the internal markers on the X-Ray image; calculating a projective transformation relating the external markers to their respective projections on scintillator based on comparison between the true location of the internal markers and location after applying the initial transformation; estimating location of projection of the external markers on the scintillator using the projective transformation; and calculating the parallax free transformation based on the relation between the location of projections of the external markers on the scintillator and location of the external markers on the X-Ray image.

Furthermore, according to embodiments of the present invention the initial transformation may include polynomial coordinate mappings.

Furthermore, according to embodiments of the present invention the parallax free transformation may include polynomial coordinate mappings.

Furthermore, according to embodiments of the present invention the external markers may include mechanical Cartesian grid.

Furthermore, according to embodiments of the present invention the external markers comprise metal sheet with substantially identical holes drilled at known locations.

Furthermore, according to embodiments of the present invention the internal markers may be placed outside a field of view of the detector used for routine operation.

According to embodiments of the present invention there is provided a multi-camera flat panel X-Ray detector, the detector may include a scintillator to convert X-Ray radiation generated by an X-Ray source into detectable radiation; internal markers placed at known locations adjacent to the scintillator of the detector, inside a casing of the detector; external markers placed at known locations outside the casing of the detector adjacent to a cover of the detector; at least one imaging sensor to acquire, during the calibration phase, a partial image related to the detectable radiation, at a field of view of the at least one imaging sensor acquiring the partial image depicting the external markers and the internal markers; and a processing unit to find the location of the external markers and the internal markers on the partial X-Ray image; and calculate a parallax free transformation for correcting geometric distortion based on differences between relation between physical location of the external markers and location of the external markers on the X-Ray image and relation between physical location of the internal markers and location of internal markers on the partial X-Ray image.

Furthermore, according to embodiments of the present invention during routine operation of the detector the at least one imaging sensor may acquire routine partial X-Ray images; and the processing unit may adjust the routine partial X-Ray images, using the parallax free transformation to obtain adjusted partial X-Ray images.

Furthermore, according to embodiments of the present invention processing unit may calculate the parallax free transformation by calculating an initial transformation for correcting geometric distortion based on the relation between physical location of the external markers and location of external markers on the X-Ray image; applying the transformation to location of the internal markers on the X-Ray image; calculating a projective transformation relating the external markers to their respective projections on scintillator based on comparison between the true location of the internal markers and location after applying the initial transformation; estimating location of projection of the external markers on the scintillator using the projective transformation; and calculating the parallax free transformation based on the relation between the location of projections of the external markers on the scintillator and location of the external markers on the X-Ray image.

Furthermore, according to embodiments of the present invention the initial transformation may include polynomial coordinate mappings.

Furthermore, according to embodiments of the present invention the parallax free transformation may include polynomial coordinate mappings.

Furthermore, according to embodiments of the present invention the external markers may include mechanical Cartesian grid.

Furthermore, according to embodiments of the present invention the external markers may include metal sheet with substantially identical holes drilled at known locations.

Furthermore, according to embodiments of the present invention internal markers are placed outside a field of view of the detector used for routine operation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
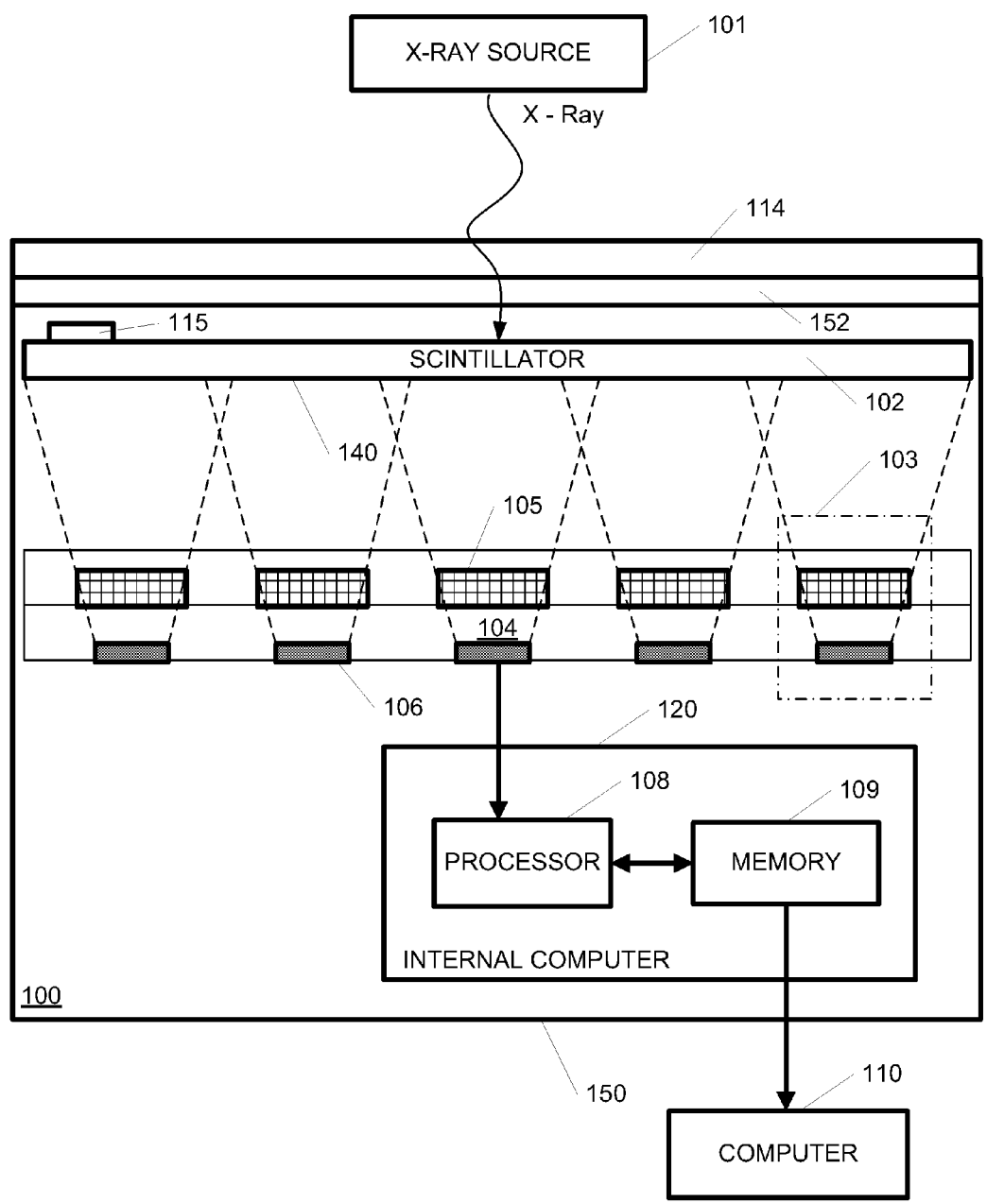
FIG. 1 is a high-level illustration of an exemplary multi-camera flat panel X-Ray detector according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS
OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Reference is made to FIG. 1 depicting a high-level illustration of an exemplary multi-camera flat panel X-Ray detector 100 according to embodiments of the present invention. According to embodiments of the present invention, detector 100 may include a scintillator layer 102, multi-camera array 104 and an internal computer 120. Detector 100 may be placed inside casing 150 having a flat cover 152 made of transparent or translucent material. Cover 152 may face X-Ray source 152 and may be removable or not removable.

For simplicity of the presentation, a right hand Cartesian coordinates system is defined. The X-Y plane of the coordinates system is parallel scintillator plane 102 of detector 100 and perpendicular to the plane of the page of FIG. 1., and the Z axis is defined perpendicular to the X-Y plane, as in right hand Cartesian coordinates system.

Scintillator layer 102 may be substantially parallel flat cover 152 and may convert X-Ray energy transmitted from X-Ray source 101 into second radiation, typically at a lower energy, which is detectable by imaging sensors 106. For example, scintillator layer 102 may convert X-Ray energy transmitted from X-Ray source 101 into visible light. Scintillator layer 102 may be made of any scintillating material suitable for converting X-Ray radiation into the second radiation, for example, visible light, such as Cesium Iodide (CsI) and GOS ($_Gd_2O_2S$: Tb). Throughout the present application, the second radiation will be referred to as detectable radiation.

Multi-camera array 104 may include a plurality of imaging sensors 106 and lenses 105. Imaging sensors 106 may be any component capable of producing a digital signal indicative of the detectable radiation impinging on the respective imaging sensor. For example, if the detectable radiation is in the range of visible light, imaging sensors 106 may include charge coupled devices (CCDs) or optical complementary metal-oxide-semiconductor (CMOS) sensors, or any other suitable optical sensor, used, for example, for off the shelf digital cameras. Sensors 106 may be arranged in array 104 in any desired configuration, such as linear, 2D array, etc. According to a typical configuration, multi-camera array 104 may include a plurality of optical modules 103, each including an arrangement of at least one lens 105 and at least one imaging sensor 106. For example, optical modules 103 may include pairs of one optical sensor 106 and one lens 105. However, other configurations may exist. Embodiments of the present invention are not confined to a specific lens and optical sensors arrangement.

Detector 100 may include a set of X-Ray translucent or opaque internal markers 115, placed inside casing 150 adjacent to scintillator 102, between scintillator 102 and X-Ray source 101, such that internal markers 115 are visible on an X-Ray image captured by detector 100. Alternatively, internal markers 115, may be translucent or opaque to visible light and placed adjacent to scintillator 102, between scintillator 102 and camera array 104.

It should be noted, however, that internal markers 115 may be placed outside the FOV of detector 100 used for routine operation, and preferably should not be visible at all on X-Ray images taken during routine operation of detector 100. Therefore, the location of internal markers 115 is limited to areas on scintillator 102 that are truncated from X-Ray images taken during routine operation of detector 100. Typically, internal markers 115 may be located at edges of scintillator 102.

In addition, during a calibration phase, a second set of external markers 114 may be placed between scintillator 102 and X-Ray source 101, outside casing 150 of detector 100, adjacent to cover 152. For example, external markers 114 may include a mechanical Cartesian grid placed adjacent to scintillator 102, parallel to the X-Y plane. The mechanical Cartesian grid may include, for example, metal sheet with substantially identical holes drilled at known and typically evenly spaced locations.

Detector 100 may include an internal computer 120 including a processor 108, adapted to receive signals from imaging sensors 106 and memory unit 109. Detector 100 may be further connected to an external computer 110. For example, external computer 110 may be connected to internal computer 120. External computer 110 may include components such as, but not limited to, a plurality of central processing units (CPU) or any other suitable multi-purpose or specific processors or controllers, a plurality of input units, a plurality of output units, a plurality of memory units, and a plurality of storage units, and may receive commands and present output to an operator of detector 100. External computer 110 may be connected (not shown) also to X-Ray source 101.

Detector 100, external computer 110, or X-Ray source 101, or a third entity (not shown) may initiate imaging by triggering imaging sensors 106 substantially simultaneously with X-Rays from X-Ray source 101. In response to the triggering signal, X-Ray radiation may be emitted by X-Ray source 101. The emitted radiation may pass through or be partially absorbed by a specimen 107, if present between X-Ray source 101 and detector 100, and be absorbed by scintillator 102. Scintillator 102 may convert the absorbed X-Ray radiation into detectable radiation. The detectable radiation may pass through lenses 105 and be focused on and detected by imaging sensors 106 of camera array 104. Each imaging sensor 106 may produce a partial image, substantially representing the detectable radiation radiated by a respective segment 140 of scintillator 102 that is within the field of view (FOV) of imaging sensor 106. However, the detectable radiation may be geometrically distorted by lenses 105. This geometric distortion may be corrected according to embodiments of the present invention described herein. The plurality of partial images produced by camera array 104, may be stored for further processing by internal computer 120 in memory unit 109.

The FOV of each imaging sensor 106 may include a respective segment 140 of scintillator 102. Each section of scintillator 102 that is within the FOV of camera array 104 may be represented in at least one partial image. Therefore a complete image of the FOV of camera array 104 may be composed, for example, by a processing unit such as internal computer 120 or external computer 110, from the stored partial images by stitching the partial images using various stitching techniques as known in the art. The resulting image is the complete X-Ray image.

For simplicity of the explanation, sources of image distortions, such as non-linearity distortion, dark current, etc. are disregarded. However it should be readily understood by those skilled in the art that methods for correction of geometric distortion according to embodiments of the present invention may be used together with other image enhancement techniques. For example, elimination of geometric distortion according to embodiments of the present invention may be used together with removal of dark current noise, for example, using dark frame subtraction, and/or methods used to eliminate vignetting, linearization of camera response function, etc. For example, it may be assumed that other sources of error are being corrected concurrently, before or after the elimination of geometric distortion according to embodiments of the present invention.

Figure 2:
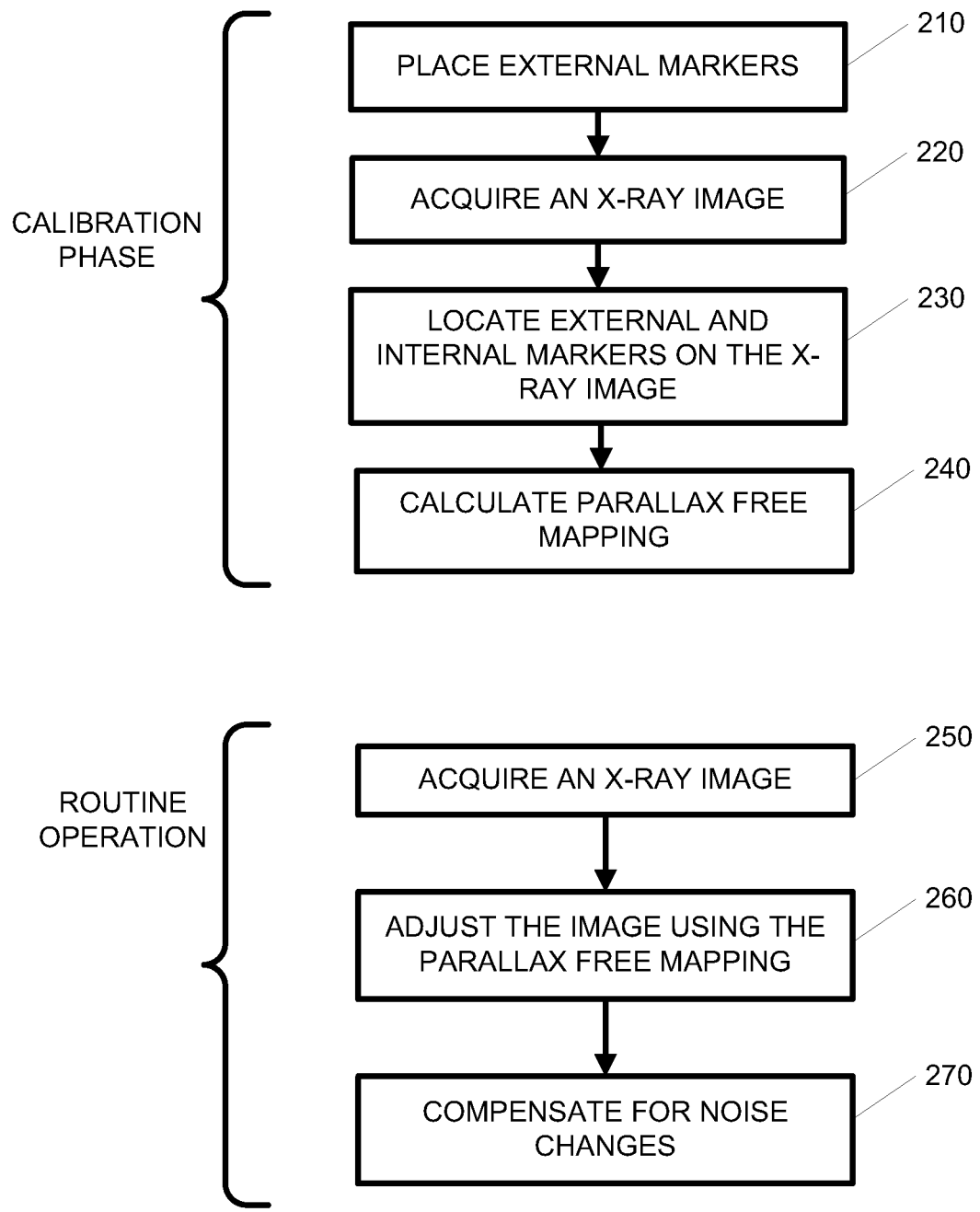
FIG. 2 is a flowchart illustration of a method for correction of geometric distortion in a multi-camera flat panel X-Ray detector according to embodiments of the present invention.

Reference is now made to FIG. 2 which is a flowchart illustration of a method for correction of geometric distortion for a multi-camera flat panel X-Ray detector according to embodiments of the present invention. According to embodiments of the present invention, a parallax free transformation may be calculated during a calibration phase and used for adjusting images during routine operation. The method may be performed by a processing unit such as internal computer 120 or external computer 110, which receives data from detector 100, and particularly from imaging sensors 106, wherein detector 100 includes internal markers 115.

During the calibration phase, external markers 114 may be placed 210 at known locations on cover 152 of detector 100. X-Ray radiation may be applied and partial X-Ray images may be acquired 220 by imaging sensors 106, the partial images depicting both external markers 114 and internal markers 115. The location of external markers 114 as well as internal markers 115 may be made 230 on the partial X-Ray images using digital image processing techniques. The true, physical location of markers 114 and 115 is known based on the design of detector 100. The location of external markers 114 on the partial X-Ray images is distorted, due to both geometric distortion of lenses 105 and parallax. The location of internal markers 115 on the partial X-Ray images is distorted substantially due to geometric distortion alone.

As used herein, external markers mapping refers to the relation between the physical location of external markers 114 and the location of external markers 114 on the distorted partial X-Ray images, and internal markers mapping refers to the relation between the physical location of internal markers 115 and the location of internal markers 115 on the distorted partial X-Ray images.

Therefore, a transformation derived based on the external markers mapping may be inaccurate due to parallax.

According to embodiments of the present invention, differences between internal markers 115 mapping and external markers mapping may give a measure of the parallax effect. Therefore, a parallax free transformation for correcting geometric distortion may be calculated 240 based on differences between internal markers 115 mapping and external markers mapping.

During routine operation of detector 100, partial X-Ray images may be acquired 250 by imaging sensors 106. The partial X-Ray images may be adjusted 260 to correct geometric distortion using the parallax free transformation:

$$x_s = p_x^{paralaxfree}(x,y)$$

$$y_s = p_y^{paralaxfree}(x,y) \quad \text{(Equation 1)}$$

Where $p_x^{paralaxfree}$ and $p_y^{paralaxfree}$ are coordinate mappings of the parallax free transformation. $p_x^{paralaxfree}$ and $p_y^{paralaxfree}$ may be any smooth functions satisfying Equation. 1, for example, e.g., polynomial, trigonometric etc. functions. It should be noted that the parallax free transformation may be calculated during the calibration phase either before of after stitching of the partial images to form the complete X-Ray image. Additionally, since internal markers 115 are located at edges of scintillator 102, not all partial images may depict internal markers 115. Therefore, according to some embodiments of the present invention, the measure of the parallax effect may be calculated based the partial images that depict internal markers 115. The measure of the parallax effect may be used for the calculation of parallax free transformation for all of the partial images, including these that do not depict internal markers 115. Similarly, adjusting X-Ray images during routine operation may also be performed either before or after stitching of the partial images to form the complete X-Ray image, with the necessary adjustments.

The plurality of partial images may be stitched to form the complete X-Ray image and the complete X-Ray image may be presented to a viewer. Adjusting the partial X-Ray images to correct geometric distortion using the parallax free transformation may improve the resolution of the complete X-Ray image.

Figure 3:
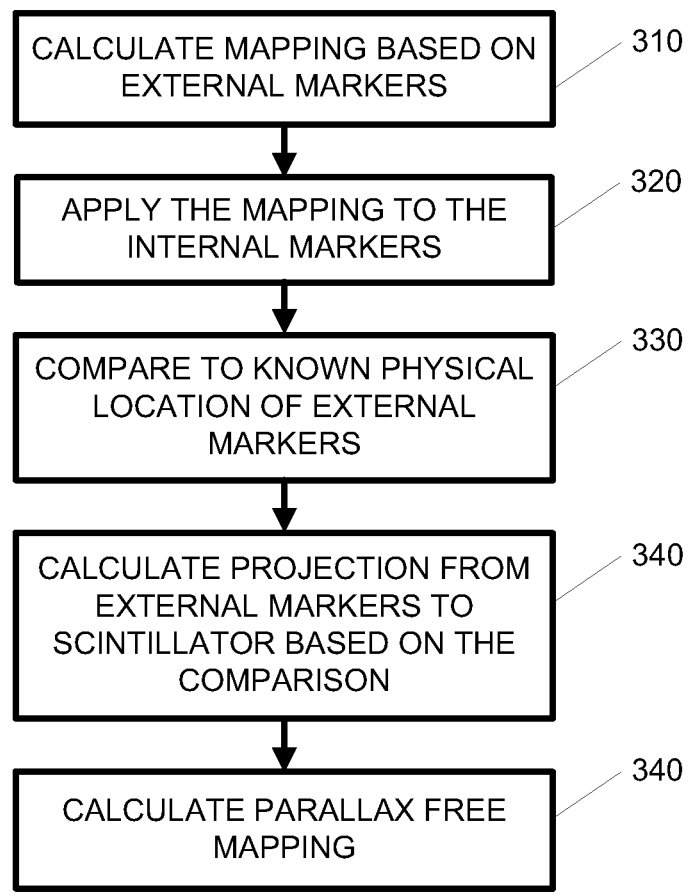
FIG. 3 is a flowchart illustration of a method for calculation of parallax free transformation for a multi-camera flat panel X-Ray detector according to embodiments of the present invention.

Reference is now made to FIG. 3 which is a flowchart illustration of a method for calculation of parallax free transformation for a multi-camera flat panel X-Ray detector according to embodiments of the present invention. For example, this method may be an elaboration of block 240 of FIG. 2.

A pixel on a partial image of an imaging sensor 106 has coordinates $(x_s, y_s)$ relatively a reference point on the partial image, for example, to a left upper corner of the partial image. Pixel $(x_s, y_s)$ corresponds to a scintillator pixel with coordinates $(x,y)$ relatively to a reference point on scintillator segment 140 corresponding to the reference point on the partial image, for example, to the left upper corner of scintillator segment 140.

An initial transformation relating pixel $(x_s, y_s)$ on imaging sensor 106 to a corresponding scintillator pixel $(x,y)$ may be found based on external markers mapping:

$$x_s = p_x^{initial}(x,y)$$

$$y_s = p_y^{initial}(x,y) \quad \text{(Equation 1)}$$

Where $p_x$ and $p_y$ are coordinate mappings of the initial transformation. $p_x$ and $p_y$ may be for example, polynomial functions. As mentioned before, this initial transformation is inaccurate due to parallax. The transformation is applied 320 to the location of internal markers 115 on the partial images. The true location of markers 115 is known based on the design of detector 100. A comparison 330 between the true location of internal markers 115 and the location after applying the initial transformation may give a measure of the parallax distortion. Knowing the measure of the parallax distortion, a projective transformation relating external markers 114 to their respective projections on scintillator 102 may be calculated 340. Thus, the location of the projection of markers 114 on scintillator 102 may be estimated. A parallax free transformation relating pixel $(x_s, y_s)$ on imaging sensor 106 to a corresponding scintillator pixel $(x,y)$ may be calculated 350 based on the relation between the location of projections of external markers 114 on scintillator 102 (which may be substantially parallax free) and the location of external markers 114 on the distorted X-Ray image.

Some embodiments of the present invention may be implemented in software for execution by a processor-based system, for example, the calculation of parallax free transformation. For example, embodiments of the present invention may be implemented in code and may be stored on a non-transitory storage medium, such as memory unit 109, having stored thereon instructions which can be used to program a system to perform the instructions. The non-transitory storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for correcting geometric distortion in a multi-camera flat panel X-Ray detector, the method comprising:
    placing internal markers at known locations adjacent to a scintillator of the detector, inside a casing of the detector;
    placing external markers at known locations outside the casing of the detector adjacent to a cover of the detector;
    acquiring an X-Ray image depicting the external markers and the internal markers;
    finding the location of the external markers and the internal markers on the X-Ray image;
    calculating a parallax free transformation for correcting geometric distortion by:
        calculating an initial transformation for correcting geometric distortion based on the relation between physical location of the external markers and location of external markers on the X-Ray image;
        applying the transformation to location of the internal markers on the X-Ray image;
        calculating a projective transformation relating the external markers to their respective projections on the scintillator based on comparison between the true location of the internal markers and location after applying the initial transformation;
        estimating location of projection of the external markers on the scintillator using the projective transformation; and
        calculating the parallax free transformation based on the relation between the location of projections of the external markers on the scintillator and location of the external markers on the X-Ray image.

2. The method of claim 1, comprising:
    adjusting X-Ray images acquired during routine operation of the detector, using the parallax free transformation.

3. The method of claim 1, wherein the initial transformation comprises polynomial coordinate mappings.

4. The method of claim 1, wherein the parallax free transformation comprises polynomial coordinate mappings.

5. The method of claim 1, wherein the external markers comprise mechanical Cartesian grid.

6. The method of claim 1, wherein the external markers comprise metal sheet with substantially identical holes drilled at known locations.

7. The method of claim 1, wherein the internal markers are placed outside a field of view of the detector used for routine operation.

8. A multi-camera flat panel X-Ray detector, the detector comprising:
    a scintillator to convert X-Ray radiation generated by an X-Ray source into detectable radiation;
    internal markers placed at known locations adjacent to the scintillator of the detector, inside a casing of the detector;
    external markers placed at known locations outside the casing of the detector adjacent to a cover of the detector;
    at least one imaging sensor to acquire, during the calibration phase, a partial image related to the detectable radiation, at a field of view of the at least one imaging sensor acquiring the partial image depicting the external markers and the internal markers; and
    a processing unit configured to:
        find the location of the external markers and the internal markers on the partial X-Ray image; and
        calculate a parallax free transformation for correcting geometric distortion by:
        calculating an initial transformation for correcting geometric distortion based on the relation between physical location of the external markers and location of external markers on the X-Ray image;
        applying the transformation to location of the internal markers on the X-Ray image;
        calculating a projective transformation relating the external markers to their respective projections on the scintillator based on comparison between the true location of the internal markers and location after applying the initial transformation;
        estimating location of projection of the external markers on the scintillator using the projective transformation; and
        calculating the parallax free transformation based on the relation between the location of projections of the external markers on the scintillator and location of the external markers on the X-Ray image.

9. The detector of claim 8, wherein during routine operation of the detector:
    the at least one imaging sensor is to acquire routine partial X-Ray images; and
    the processing unit is to adjust the routine partial X-Ray images, using the parallax free transformation to obtain adjusted partial X-Ray images.

10. The detector of claim 8, wherein the initial transformation comprises polynomial coordinate mappings.

11. The detector of claim 8, wherein the parallax free transformation comprises polynomial coordinate mappings.

12. The detector of claim 8, wherein the external markers comprise mechanical Cartesian grid.

13. The detector of claim 8, wherein the external markers comprise metal sheet with substantially identical holes drilled at known locations.

14. The detector of claim 8, wherein the internal markers are placed outside a field of view of the detector used for routine operation.

* * * * *